United States Patent [19]
Grabowski

[11] Patent Number: 6,073,721
[45] Date of Patent: Jun. 13, 2000

[54] METHOD FOR LIMITING HYDRAULIC ASSIST IN A POWER ASSIST STEERING SYSTEM

[75] Inventor: John Robert Grabowski, Dearborn, Mich.

[73] Assignee: Ford Global Technologies, Inc.

[21] Appl. No.: 09/088,791

[22] Filed: Jun. 1, 1998

[51] Int. Cl.[7] ...................................................... B62D 5/06
[52] U.S. Cl. ............................ 180/422; 180/446; 701/41
[58] Field of Search .................................. 180/421, 422, 180/446; 701/41, 42

[56] References Cited

U.S. PATENT DOCUMENTS

| | | | |
|---|---|---|---|
| 4,153,133 | 5/1979 | Anderson . | |
| 5,283,741 | 2/1994 | Desrus | 364/424.05 |
| 5,446,657 | 8/1995 | Ikeda et al. | 364/424.05 |
| 5,508,919 | 4/1996 | Suzuki et al. | 180/422 |
| 5,711,394 | 1/1998 | Fujii et al. | 180/422 |
| 5,761,627 | 6/1998 | Seidel et al. | 701/41 |
| 5,762,159 | 6/1998 | Matsuoka et al. | 180/422 |
| 5,907,277 | 5/1999 | Tokunaga | 180/446 |
| 5,919,241 | 7/1999 | Bolourchi et al. | 180/446 |

*Primary Examiner*—J. J. Swann
*Assistant Examiner*—Michael Cuff
*Attorney, Agent, or Firm*—Ford Global Technologies, Inc.

[57] ABSTRACT

A method is provided for controlling an electro-hydraulic power assist steering system including a variable-speed electric motor for pumping hydraulic fluid in the system. The method includes monitoring a vehicle steering wheel angle and determining if the vehicle steering wheel angle exceeds a steering travel limit. If the steering travel limit is exceeded, the method reduces a desired motor speed to a predetermined end of travel motor speed until the steering wheel angle drops below the steering travel limit. Accordingly, energy is conserved by reducing the power consumed while the steering system is maintained at its steering travel limit.

9 Claims, 2 Drawing Sheets

METHOD FOR LIMITING HYDRAULIC ASSIST IN A POWER ASSIST STEERING SYSTEM

TECHNICAL FIELD

The present invention relates to a method for controlling an electro-hydraulic power assist steering. More particularly, the present invention provides a method for limiting hydraulic assist in a power assist steering system when the steering system is turned against or near its end stops.

BACKGROUND OF THE INVENTION

In hydraulic power assist steering systems, a hydraulic pump provides hydraulic fluid for assisting steering action. The pump is directly driven by an engine or an electric motor in the case of an electro-hydraulic power assist system. In these systems, the steering system can be turned to such a degree that the steering rack reaches its travel limits, also referred to in the art as its end stops. If an operator holds the steering system "against" the end stops, especially with force, considerable power can be consumed by the pump, while causing no change in the vehicle steering.

In systems employing engine driven hydraulic pumps, relief valves have been used to divert hydraulic flow to prevent overloading the hydraulic pump. However, due to their considerable expense and complexity, coupled with their lack of complete effectiveness reducing power loss, other solutions would appear to be desirable.

It is therefore a recognized desire among those skilled in the art to provide a hydraulic power assist steering control system in which efficiency is significantly improved by limiting or reducing hydraulic pumping losses otherwise incurred when the system is operated near or against the steering end stops.

SUMMARY OF THE INVENTION

The present invention provides a method of controlling an electro-hydraulic power assist steering system in which the speed of a variable-speed electric motor is controlled based upon monitored vehicle speed, vehicle steering wheel angle, and vehicle steering wheel turning rate. In this manner, system efficiency may be optimized by maintaining a substantially low base motor speed under certain conditions while providing needed power steering assist in a wide variety of vehicle operating conditions.

More specifically, the present invention provides a method of compensating a control signal for an electro-hydraulic power assist steering system including a variable-speed electric motor for pumping hydraulic fluid in the system. The method includes: a) monitoring vehicle steering wheel angle; b) determining if said vehicle steering wheel angle exceeds a steering travel limit; and c) reducing a desired motor speed to a predetermined end of travel motor speed until said steering wheel angle drops below said steering travel limit.

Accordingly, an object of the present invention is to provide an improved method of controlling an electro-hydraulic power assist steering system in which the speed of a variable speed electric motor is reduced when the steering system is operated at or near its travel limit.

The above object and other objects, features and advantages of the present invention are readily apparent from the following detailed description of the best mode for carrying out the invention when taken in connection with the accompanying drawings.

DETAILED DESCRIPTION OF THE PREFERRED EMBODIMENT

Figure 1:
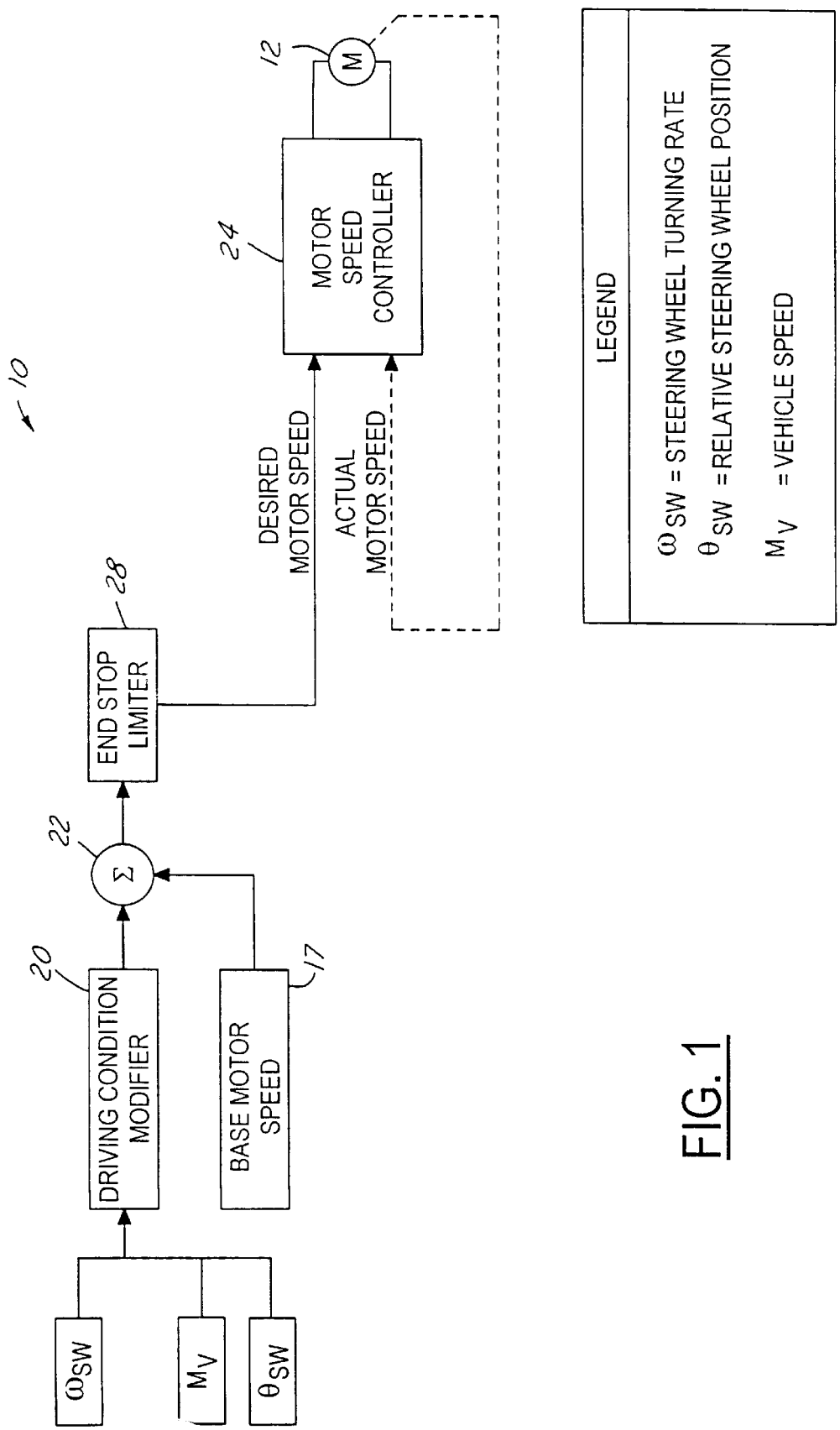
FIG. 1 shows a schematic block diagram of a control system in accordance with the present invention.

The control system 10 shown in FIG. 1 in accordance with the present invention is part of an electro-hydraulic power assist steering system which uses an electric motor 12 to drive a hydraulic pump, which in turn produces the system pressure used to move the steering rack. Movement of the steering rack is limited within a predetermined range by mechanical end stops, one at each end of the steering mechanism. The pump flow is continuously varied, preferably every millisecond, by control of the speed of the electric motor. This control technique provides the minimum amount of flow required to maintain good steering feel without wasting energy. This method of control provides a substantial improvement in efficiency over other electro-hydraulic and conventional power steering systems, since both generally provide excessive pump flow during most steering conditions.

Using variable flow and an improved strategy permits the optimization of various steering modes, independent of one another, through appropriate control of the pump flow. Further, the steering system response can be widely reconfigured through unique and even driver specific calibrations of the control software, offering many new alternatives for customized steering feel.

Generally, this algorithm uses vehicle speed ($M_V$), steering wheel relative position ($\theta_{SW}$) and steering wheel turning rate ($\omega_{SW}$) as the control inputs. It is notable that the system does not require a yaw sensor, a torque sensor or a separate steering wheel turning rate sensor, thus reducing the cost and complexity of the present invention relative to those that require this additional hardware. The system 10 establishes a base motor speed at block 17. Using the control inputs obtained from a steering wheel angle sensor and a vehicle speed sensor, the system determines what changes to make to the base motor speed at the driving condition modifier block 20. A desired motor speed signal is generated by summing the signals from blocks 17 and 20 at summation block 22. In this manner, a motor speed command is generated by the motor speed controller 24 in response to the desired motor speed.

When the steering wheel is rotated sufficient to cause the steering rack to stop against one of the end stops, large pressures can be built up in an electro-hydraulic, as well as a conventional power steering system. With this improved strategy, at block 28, this condition is prevented by detecting the location of the end stops and then limiting the desired motor speed when the steering rack becomes very close or actually engages one of the end stops.

Figure 2:
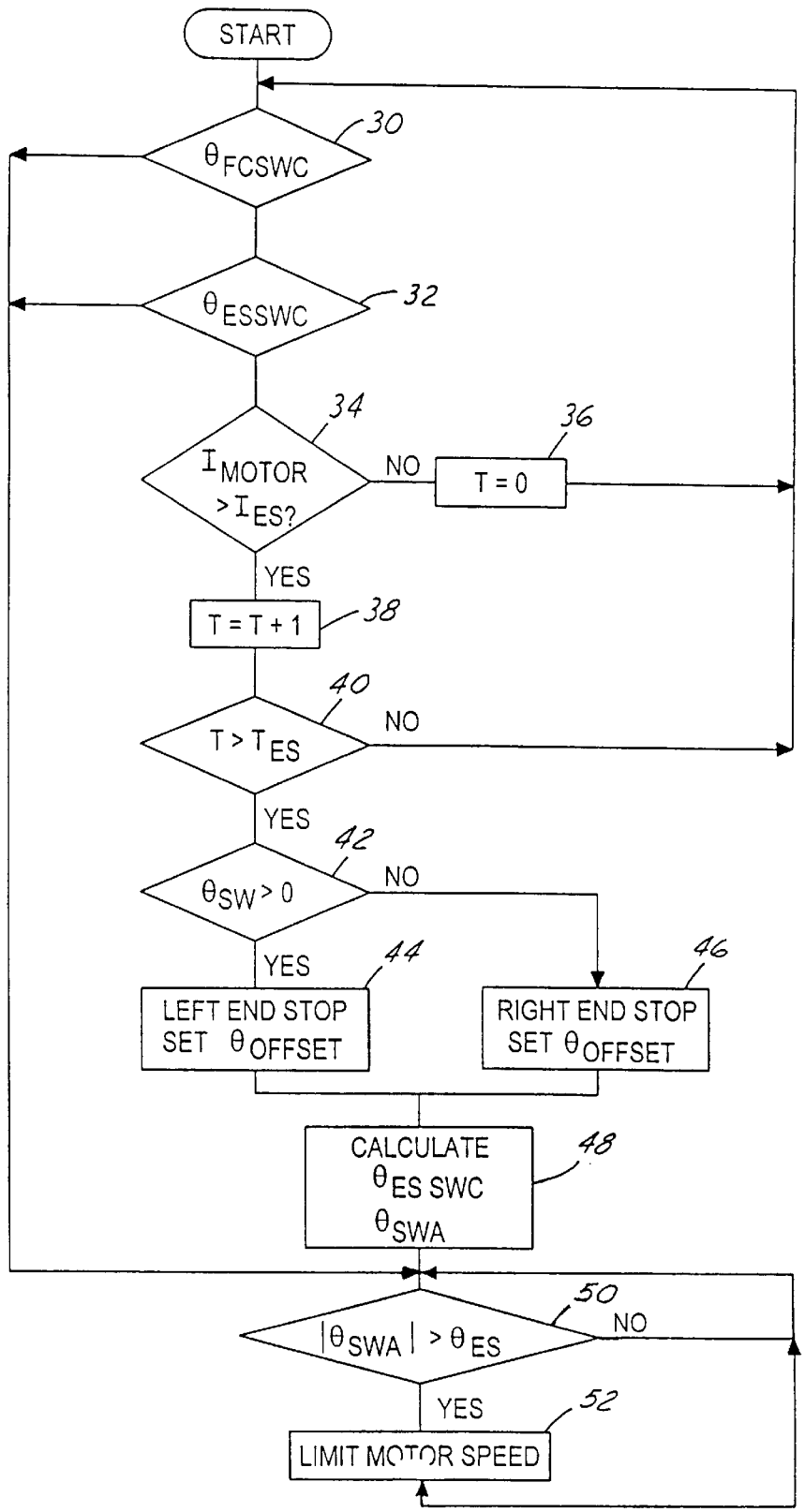
FIG. 2 shows a logic flow diagram of a method in accordance with the present invention.

Referring now to FIG. 2, the end stop detection and desired motor speed limitation will be described in greater detail. Before the desired motor speed can be limited, the system must be able to detect impending or actual end stop contact. This can be done easily if an absolute center of the steering system is known, because the end stops are located approximately a constant distance from the center position of the steering. It is desirable, however, to avoid the cost of an absolute position sensor, therefore a method must be employed to rapidly find the center position of the steering system.

One possibility is to use a find center system that relies on traveling a sufficient distance above a predetermined speed to infer a straight direction of travel and thus a find center based steering wheel center position, $\theta_{FCSWC}$. The speed with which such a find center system acquires an accurate steering wheel center position, $\theta_{FCSWC}$, can be improved by incorporating a yaw sensor, however, even the fastest find center systems will not find a center position until the vehicle has traveled straight for some distance.

The method of the present invention, at block 30 determines whether a find center steering wheel center position has been determined. If yes, the method advances to limit the desired motor speed if and when the steering rack becomes very close or actually engages one of the end stops, which will be described further below. If no, the method advances to block 32.

Similarly, at block 32, the method determines if a steering wheel center position, $\theta_{ESSWC}$, has been detected by detecting the end stops. If yes, the method advances to limit the desired motor speed if and when the steering rack becomes very close or actually engages one of the end stops. If no, the method advances to block 34.

At block 34 the method monitors steering system torque by monitoring an electrical current, $I_{MOTOR}$, supplied to the drive motor, and determines if it exceeds an end stop electrical current threshold constant, $I_{ES}$. To avoid false indications of an end stop condition, such as when a tire is constrained against a curb or in mud, etc., the electrical current, $I_{MOTOR}$, must exceed the end stop electrical current threshold constant, $I_{ES}$, for a predetermined period of time, $T_{ES}$. Blocks 36, 38 and 40 effectively accomplishing this by restarting the process unless $I_{MOTOR}$ continuously exceeds $I_{ES}$ for a period of $T_{ES}$. Once this condition is satisfied, the method has established with confidence that steering system is physically against an end stop and the method proceeds to block 42.

At block 42, the method must determine which end stop, the right or the left, the steering system is against. This can be determined by evaluating the sign of a steering wheel signal, $\theta_{SW}$, from the steering position sensor. When the vehicle is started, before the steering wheel is turned at all, it has a zero value. In order to hold the steering wheel against an end stop, the wheel must be turned a nominal amount in the direction of the end stop. This is due to forces in the suspension and steering system that force the steering system back toward center from an end stop position. So, even if the steering system were held against one of the end stops when the vehicle was shut off, the steering system would return a slight amount toward center. Therefore, upon restarting, the steering wheel must be turned toward the stop to again contact it. This provides enough signal to determine whether a right or left end stop has been detected and an appropriately signed steering wheel center position offset, $\theta_{OFFSET}$, is calculated at block 44 or 46 in accordance with the known end stop position.

The method proceeds to block 48, and calculates the end stop based steering wheel center position, $\theta_{ESSWC}$, and an absolute steering wheel position, $\theta_{SWA}$, relative thereto which will be used to determine if the desired motor speed needs to be limited at block 50.

At block 50, the method compares a magnitude of the current absolute steering wheel position, $\theta_{SWA}$, determined by adjusting the steering wheel signal, $\theta_{SW}$, in accordance with either the find center based steering wheel center position, $\theta_{FCSWC}$, or the end stop based steering wheel center position, $\theta_{ESSWC}$, against a steering travel limit, $\theta_{ES}$. The steering travel limit may correspond directly to the actual physical end stop, or it may be set to a value slightly smaller than the angle of the physical end stop, about twenty degrees in the presently preferred embodiment. This would be desirable to provide further protection of the pump motor and greater flexibility in the control system. For instance, with this difference, it would be possible to reduce or limit the desired motor speed prior to attaining the actual end stops. If the current absolute steering wheel position, $\theta_{SWA}$, exceeds the steering travel limit, $\theta_{ES}$, the method proceeds to block 52 and if not the query is repeated until $\theta_{SWA}$, exceeds the steering travel limit, $\theta_{ES}$, indicating that an end stop is encountered.

If the steering travel limit is exceeded, the method reduces a desired motor speed to a predetermined end of travel motor speed until the steering wheel angle drops below the steering travel limit.

When the system is against an end stop, the method will limit power consumption to a small level by reducing the desired motor speed to a predetermined end of travel motor speed at a limit block 52. The method then returns to block 50 such that the limit block 52 will continue to limit the desired motor speed until the steering wheel angle drops below the steering travel limit. The predetermined end of travel motor speed may be set to the base motor speed, or to a fixed or variable percentage of the desired motor speed.

It should be noted that this protection is generally only invoked at low speed parking operation, as it is very unlikely to encounter end stops at higher vehicle speeds.

While the best mode for carrying out the invention has been described in detail, those familiar with the art to which this invention relates will recognize various alternative designs and embodiments for practicing the invention within the scope of the appended claims.

What is claimed is:

1. A method for limiting hydraulic assist in a power assist steering system including a variable-speed electric motor for pumping hydraulic fluid in the system, the method comprises the steps of:

monitoring vehicle steering wheel angle;

determining if said vehicle steering wheel angle exceeds a steering travel limit; and reducing a desired motor speed to a predetermined end of travel motor speed until said steering wheel angle drops below said steering travel limit.

2. The method of claim 1, wherein said steering wheel travel limit is selected such that said steering wheel angle exceeds said steering wheel travel limit before attaining an actual end stop position.

3. The method of claim 1, wherein said predetermined end of travel motor speed equals a base motor speed.

4. The method of claim 1, wherein said step of monitoring vehicle steering wheel angle further comprises the steps of:

monitoring an electrical current supplied to said variable-speed electric motor and determining if said electrical current exceeds an end stop current threshold for a predetermined period of time;

monitoring a vehicle steering wheel sensor signal and determining whether a right or left end stop was found; and calculating a vehicle steering signal offset for use in calculating a vehicle steering wheel angle from said vehicle steering wheel sensor signal.

5. A method for limiting hydraulic assist in a power assist steering system including a variable-speed electric motor for pumping hydraulic fluid in the system, the method comprises the steps of:

monitoring an electrical current supplied to said variable-speed electric motor and determining if said electrical current exceeds an end stop current threshold for a predetermined period of time;

monitoring vehicle steering wheel sensor signal; and reducing a desired motor speed to a predetermined end of travel motor speed until said steering wheel sensor signal indicates a predetermined amount of steering return.

6. The method of claim 5, wherein said predetermined end of travel motor speed equals a base motor speed.

7. A method for limiting hydraulic assist in a power assist steering system including a variable-speed electric motor for pumping hydraulic fluid in the system, the method comprises the steps of:

monitoring an electrical current supplied to said variable speed electric motor and determining if said electrical current exceeds an end stop current threshold for a predetermined period of time;

monitoring a vehicle steering wheel sensor signal and determining whether a right or left end stop was found;

calculating a vehicle steering signal offset for use in calculating a vehicle steering wheel angle from said vehicle steering wheel sensor signal;

determining if said vehicle steering wheel angle exceeds a steering travel limit; and reducing a desired motor speed to a predetermined end of travel motor speed until a magnitude of said steering wheel angle is less than said steering travel limit.

8. The method of claim 7, wherein said steering wheel travel limit is selected such that said steering wheel angle exceeds said steering wheel travel limit before attaining an actual end stop position.

9. The method of claim 7, wherein said predetermined end of travel motor speed equals a base motor speed.

* * * * *